US012706754B1

(12) United States Patent
Stohlmann et al.

(10) Patent No.: US 12,706,754 B1
(45) Date of Patent: Aug. 11, 2026

(54) SYSTEM AND METHOD FOR ASYNCHRONOUS REMOTE SIGNATURE

(71) Applicant: Veeva Systems Inc., Pleasanton, CA (US)

(72) Inventors: Jennifer Leigh Stohlmann, Greenville, SC (US); Cindy Chiang, Sunnyvale, CA (US); Rajinder Kaur, Elk Grove, CA (US); Arno Sosna, Pleasanton, CA (US); Stephanie Y. Shaw, Seattle, WA (US); Vasanth Shenoy, San Ramon, CA (US)

(73) Assignee: Veeva Systems Inc., Pleasanton, CA (US)

( * ) Notice: Subject to any disclaimer, the term of this patent is extended or adjusted under 35 U.S.C. 154(b) by 282 days.

(21) Appl. No.: 18/301,138

(22) Filed: Apr. 14, 2023

(51) Int. Cl.
*H04L 9/32* (2006.01)
*G06F 21/62* (2013.01)

(52) U.S. Cl.
CPC ........ *H04L 9/3252* (2013.01); *G06F 21/6218* (2013.01); *H04L 9/3297* (2013.01)

(58) Field of Classification Search
CPC ............. G06F 21/6218; G06F 21/6245; G06F 16/248; G06Q 30/01; G06Q 10/107; G06Q 10/103; G06Q 10/10; H04L 63/10
See application file for complete search history.

(56) References Cited

U.S. PATENT DOCUMENTS 8,471,749 B2 * 6/2013 Kabir ..................... H03K 5/249 341/120
10,902,081 B1 * 1/2021 Gassner ............... G06Q 10/103
11,303,463 B1 * 4/2022 Kallman ............. H04L 12/1822
11,429,932 B1 * 8/2022 Kallman ............... H04L 63/102
11,551,794 B1 * 1/2023 Lofgren .............. G06F 21/6245
2012/0072837 A1 * 3/2012 Triola ..................... G06Q 10/10 715/268
2013/0054707 A1 * 2/2013 Muszynski ............ G06Q 30/01 709/206
2014/0208247 A1 * 7/2014 Dayan ................. G06F 3/04817 715/765
2015/0089602 A1 * 3/2015 Murphy ................ H04L 51/063 726/4
2015/0150098 A1 * 5/2015 Murphy ................. G16H 10/60 726/4
2016/0063223 A1 * 3/2016 Raley ..................... G06Q 10/06 705/51
2016/0323448 A1 * 11/2016 McBrearty ............. G06Q 10/10
2017/0161439 A1 * 6/2017 Raduchel ............... G16H 10/60
2018/0157764 A1 * 6/2018 Longo ................... H04L 51/063
2018/0241569 A1 * 8/2018 Harmon .................. H04L 67/52
2019/0199724 A1 * 6/2019 Kallman ................. H04L 63/10
2023/0177204 A1 * 6/2023 Eneim .................. G06V 40/172 726/28

* cited by examiner

*Primary Examiner* — Tae K Kim

(57) ABSTRACT

System and method for asynchronous remote signature, including a system and method for processing a remote sample request and remote consent. Call reports are generated which enable users to capture data and make edits to detailing and sampling information unique to each HCP in a call with a user. Business card replies, or sample requests, require signature authorization from the HCP. A time-restricted asynchronous remote signature link is sent to the HCP and provides an interface for signature input without requiring the user to be concurrently engaged in the session. BCR entries are locked while the signature request is pending.

19 Claims, 12 Drawing Sheets

FIG. 3A 300 330 FIG. 3B

Media

| Presentation Name | Product | Message | Description | Reaction |
|---|---|---|---|---|
| Coldcap Red | Coldcap | Introduction | Introduction Slide | Positive |
| Coldcap Rep | Coldcap | Efficacy vs. Competing treatments | Show the clinical results of Coldcap compared to competing treatments that claim the same indications | -- None -- |

340

Call Objectives

- [x] Coldcap Launch 6 Month Checkpoint
- [ ] Coldcap Launch 1 Year Checkpoint
- [ ] Coldcap Launch 18 Month Checkpoint
- [x] Restalot 4 Launch 1 Year Checkpoint
- [ ] Restalot 4 Launch 18 Month Checkpoint Add Other Coldcap Launch 6 Month Checkpoint Field Value Field Value Restalot 4 Launch 1 Year Checkpoint Field Value Field Value

PI (0)

- [ ] Coldcap Package Insert Update August 2014
- [ ] Restalot 4 Package Insert Side Effects Amendment July 2014
- [ ] Supero PI Update June 2014
- [ ] Zuludox Package insert Amendment July 2014

Add Other

350

Samples And Promotional Items

BRC

| Product | Lot | Quantity |
|---|---|---|
| Coldcap 20mg | C2345678 | 15 |
| Coldcap 50mg | c8901g23 | 15 |

| Product | Ship To Address | Quantity |
|---|---|---|
| Coldcap BRC | 123 Main St. Philadelphia, PA 19130 | 15 |
| Labyrinth BRC | 123 Main St. Philadelphia, PA 19130 | 15 |

400

402 401 403 404

Cancel Call Report AR In-person

Professional Information 405

Account
Ackerman, Clinton

Record Type
Call Report

Medical Event
Cholecap Efficacy

Sample Card #

Validation Rule Override

Samples And Promotional Items 406

BRC

| Product | Lot # | Quantity |
|---|---|---|
| Coldcap 20mg | C2345678 | 15 |
| Coldcap 50mg | c8901g23 | 15 |

Add BRC

Samples

Add Samples

FIG. 4A

SYSTEM AND METHOD FOR ASYNCHRONOUS REMOTE SIGNATURE

TECHNICAL FIELD

The present disclosure relates generally to systems and methods for asynchronous remote signature, including methods and systems for processing a remote sample request and remote consent.

BACKGROUND

In the pharmaceutical industry, the distribution of drug samples is heavily monitored by the Food and Drug Administration (FDA) and Drug Enforcement Agency (DEA). A comprehensive and regulated process must first occur before customers (e.g., pharmaceutical manufacturers/companies) can supply healthcare providers the pharmaceutical samples for distribution to patients. Written requests by health care providers are required and there is a need to comply and adhere to strict industry rules and regulations. As such, improving and modernizing the paper-based distribution of samples has been hampered by risks (regulatory and otherwise). The existing paper-based solution for drug sample distribution in Customer Relationship Management (CRM) systems involves allowing a signed paper sample request form to be linked to a call record with a health care provider (HCP) in lieu of obtaining a signature in CRM. However, there are many inconveniences and challenges with this solution. First, the pharmaceutical representative or HCP must complete the details on their own, so populating the paper form with up-to-date details from CRM can be cumbersome. Second, the signature is obtained from the HCP prior to sampling validation rules running in CRM. Third, sampling limits are not enforced. Fourth, the paper forms are not electronically archived for sample record keeping requirements. Some customers have forms returned to a vendor for scanning and archiving or hire third parties to process the signed paper forms which is inefficient and expensive.

Veeva CRM customers have the option for a remote signature request session. However, the pharmaceutical representative is required to be engaged in the remote signature request session until the HCP signs the sample forms (e.g., sample requests, acknowledgement of content, opt-ins, etc.). This is not always feasible as it is already difficult as is to find availabilities in everyone's busy schedule. HCPs do not have the option to electronically remote sign sample forms on their own time. There is a need to provide customers the flexibility of paper-based sampling with the speed, accuracy, and accountability of remote signature requests generated from CRM.

SUMMARY

Embodiments disclosed in the present document provide a system and machine-implemented method for asynchronous remote signature, including a system and machine-implemented method for processing a remote sample request and remote consent. The method comprises: establishing a secure information management system, the information management system storing and providing coordinated data; receiving, by a first user computing device, information about a set of one or more samples from a call report recording the interaction between a first user and second user according to a communication protocol, wherein the call report is stored in the secure information management system and the set of one or more samples inputted is a pharmaceutical product; sending a time-restricted asynchronous share link to the second user, wherein the period of time the second user may access the shared link is previously configured by the first user; creating and tracking a signature request status object, wherein the signature request status object contains the current status of the asynchronous signature process; and locking business reply card entries on the call report until the asynchronous share link is accessed and a signature is received.

BRIEF DESCRIPTION OF THE DRAWINGS

For a more complete understanding of the present application and its advantages, references is now made to the following description taken in conjunction with the accompanying drawings, in which like reference numbers indicate like features.

FIGS. 3A and 3B illustrate an exemplary user interface for a call report according to one embodiment of the present invention;

FIGS. 4A and 4B illustrates an exemplary user interface for a call report according to another embodiment of the present invention;

Although similar reference numbers may be used to refer to similar elements for convenience, it can be appreciated that each of the various example embodiments may be considered to be distinct variations.

Figure 1A:
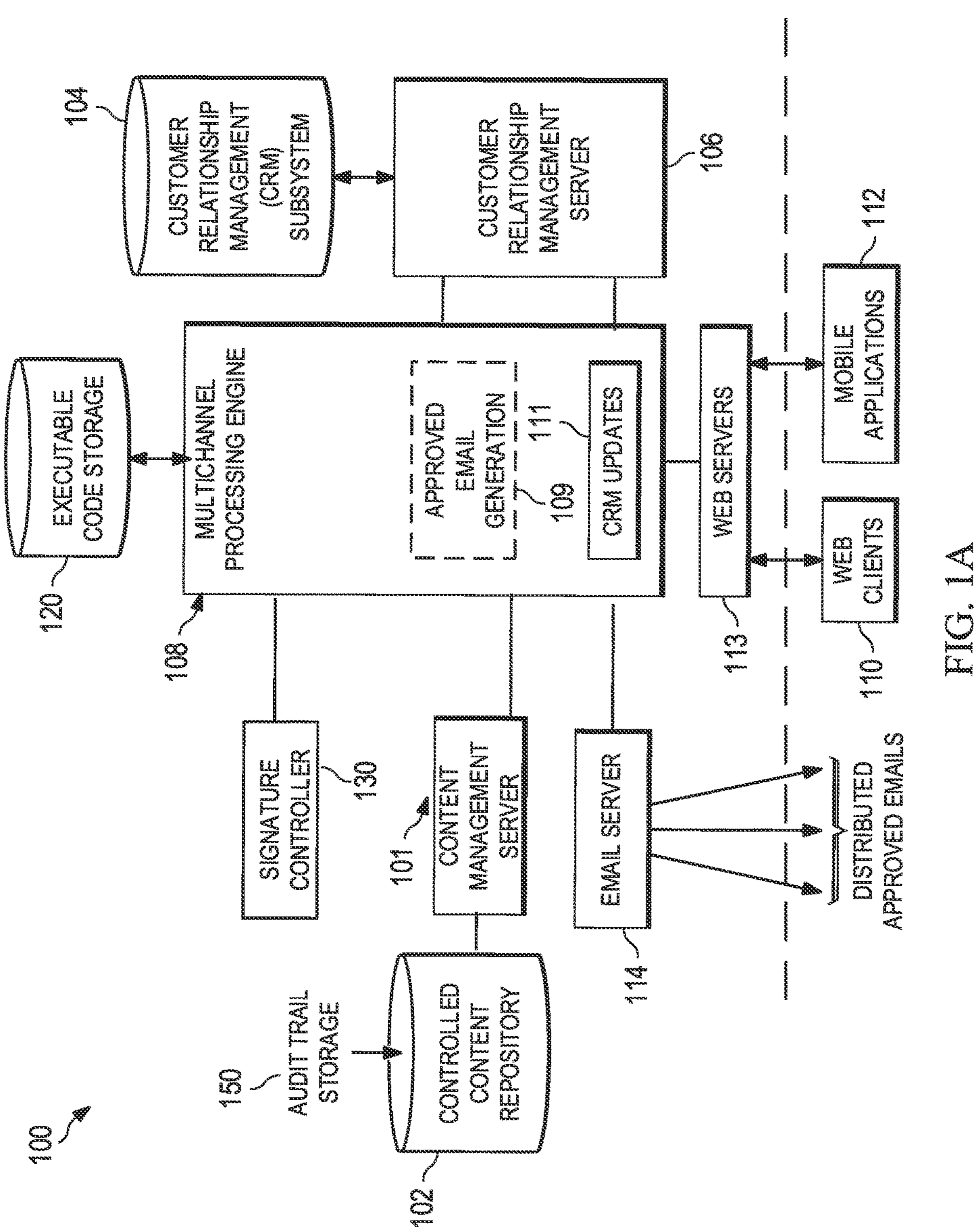
FIG. 1A illustrates an exemplary architecture for providing asynchronous remote signatures according to one embodiment of the present invention.

The present embodiments will now be described hereinafter with reference to the accompany drawings, which form a part thereof, and which illustrate example embodiments which may be practiced. As used in the disclosures and the appending claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on,"

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

A typical existing solution for remote signature involves a digital electronic signature utilizing an identity management system. The user is required to create a login account and the identity management system would manage the users credentials. However, the user would need to login with a password in order to sign a document. Another existing solution for remote signature capture involves placing a signature on an existing electronic document (e.g., PDF, contract, etc.). However, these solutions only place signatures on PDFs and not on records required for pharmaceutical sample forms (e.g., sample requests, acknowledgement of content, opt-ins, etc.). There is a need for capturing a handwritten remote signature without requiring the user to login with managed credentials, while also obeying existing pharmaceutical sampling logic rules and regulations (e.g. checking licenses, verifying HCPs are allowed to receive specific samples, decrementing sample limits, creating sample transaction records or sample order transaction records, etc.).

Embodiments disclosed in the present application allow for asynchronous remote signatures, including a system and machine-implemented method for processing a remote sample request and remote consent. The system and methods disclosed comply with Title 21 CFR part 11 in US and the European counterpart Annex XI in the EU. 21 CFR part 11 is a portion of the Code of Federal Regulations that provides standards determined by the Food and Drug Administration (FDA) on electronic records and electronic signatures.

In disclosed embodiments, intelligent and flexible updating of records may be provided within the customer relationship management subsystem, including such approaches as communicating with third-party systems and sources in order to verify and update customer information in an effective and timely manner, such as by using the collective information gained by managing a cloud-based system/Software-as-a-Service (SaaS) system on behalf of multiple company customers for the disclosed embodiments. After tailored approved emails are constructed by the customer and/or user, the content contained within the tailored approved email may be once again checked for accuracy and validity by the system before release to the email server. When a recipient accesses content within a tailored approved email, the recipient is directed to a customer portal through which the content is accessed. The recipient may be only allowed access to the most current version of the approved content within the content repository. In this manner, the content received and viewable by the recipient has been verified in real-time as being compliant, approved content.

FIG. 1A is exemplary architecture for providing asynchronous remote signatures. The presently disclosed embodiment comprises a content management server 101, a controlled content repository 102, a Customer Relationship Management (CRM) server 106, a multichannel processing engine 108, and a signature controller 130. The customer relationship management server 106 may provide access to a customer relationship management subsystem 104, and the multichannel processing engine 108 may be coupled to the content management server 101, the CRM server 106, and an email server 114. In one embodiment, the customer relationship management subsystem 104, the teleconference controller 131, and/or the email server 114 may be operated by a third party. The multichannel processing engine 108 may be accessed by users such as company sales representatives through web clients 110 or through mobile apps 112 (such as iOS, Android, Blackberry, or Windows Mobile systems), communicating with the multichannel processing engine 108 through web servers 113. Although the users may be described in the present application as being company sales representatives, this particular described embodiment is not intended to limit the generality of the claims that may eventually issue in patents stemming from the present disclosure.

The controlled content repository 102 is designed to have a process for developing approved content that is sharable across multiple users, such as shareholders, reviewers, managers, marketing personnel, sales representatives, etc. The content generated in the controlled content repository 102 may be accessed on a regulated basis and used to generate approved electronic communications. This regulated basis may be determined, in part, by the company as a whole and additionally by interaction with data from the customer relationship management subsystem 104, described in further detail below. In one embodiment, approved content, customer profile information, customer preferences, and regulatory limitations and requirements may be stored in a table in the controlled content repository 102. In addition to storage and development of content, the controlled content repository 102 may also store an audit trail, tracking exact content of communications as they were sent by the user (e.g. pharmaceutical rep), as well as metadata about the communications and information regarding the content accessed by recipients (e.g. HCP).

The customer relationship management subsystem 104 contains all professional information of HCPs that may be available to users, including contact information, licensing information, areas of practice, and specialties. In addition, the customer relationship management subsystem 104 may also be capable of storing configurations regarding specific preferences, regulatory limitations and requirements, and other fields that will facilitate the generation of appropriate approved electronic communications, in general or on a by recipient basis. These preferences and/or requirements include both the preferences of the user (e.g., maintaining account lists) as well as the preferences of the enterprise (e.g., employers of the users), discussed in further detail below. In some examples, the approved content and email templates may be pre-processed and stored in the controlled content repository 102 and provided to the multichannel processing engine 108 during the process for generating a tailored approved email. In other examples, the customer relationship management subsystem 104 may have a content management subsystem and may provide the approved content and the templates.

In this embodiment, the customer relationship management subsystem 104 is capable of communication with multiple sources through the customer relationship management server 106 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer contacts. In this manner, the customer relationship management subsystem 104 pulls the approved version of what represents an account or physician, which then pulls from multiple networks to ensure that the information regarding an account is up-to-date. The customer relationship management subsystem 104 may also be used to determine the type of domain an email communication is delivered through. A recipient in Spain may receive an email from "Companyx.es, whereas a recipient in Germany would receive the same email from "Companyx.ge." This may allow for additional branding options for the company controlling and sending the electronic communications.

With further reference to the customer relationship management subsystem 104, this system may be a cloud-based customer database that provides a central access to store and distribute consistent data across customer companies as well as their possible third-party partners and agencies that are used to keep this data updated. This system can provide standard data formats and provide an easy and automated way for customers (e.g. pharmaceutical companies) and/or users (e.g. pharmaceutical reps) to have access to coordinated and frequently updated CRM data and to use that coordinated data for sending approved electronic communications in accordance with the system described herein. In an embodiment, the multichannel processing engine 108 is responsible for combining the customer account information from the customer relationship management subsystem 104 with content available from the controlled content repository 102. Within the customer relationship management subsystem 104, customer accounts may be assigned a set of alignment rules which determine specific pieces of content that are available for use from the controlled content repository 102. The multichannel processing engine 108 may apply these rules and supply the user with a list of approved tailored email templates and pieces of content that may then be used to construct a tailored approved email communication. Tailored approved email generation occurs within the multichannel processing engine 108 according to executable code computer instructions stored in executable code storage 120. The executable code comprises computer readable instructions stored on the computer readable medium (the code storage medium 120). The executable code storage 120 is in communication with the various computing machines in the system 100 such as the customer relationship management server 106 and the multichannel processing engine 108. The same or another executable code storage 120 may be accessed by the previously described components of the controlled content repository 102 for providing separate computer readable code for operating upon by processing machines in that system. In all cases, the code is programmed to perform the functions that are described in the present embodiments and/or additional functions according to system design needs.

Communication between the multichannel processing engine 108 and the customer relationship management subsystem 104 may occur via the customer relationship management server 106, which acts as an interface between the two. The customer relationship management server 106 may act solely as an entry and exit point for the customer relationship management subsystem 104. The user may access the multi-channel processing engine 108 through either a Web Client 110 or through the mobile apps 112 (such as iOS, Android, Blackberry, or Windows Mobile systems).

Figure 1B:
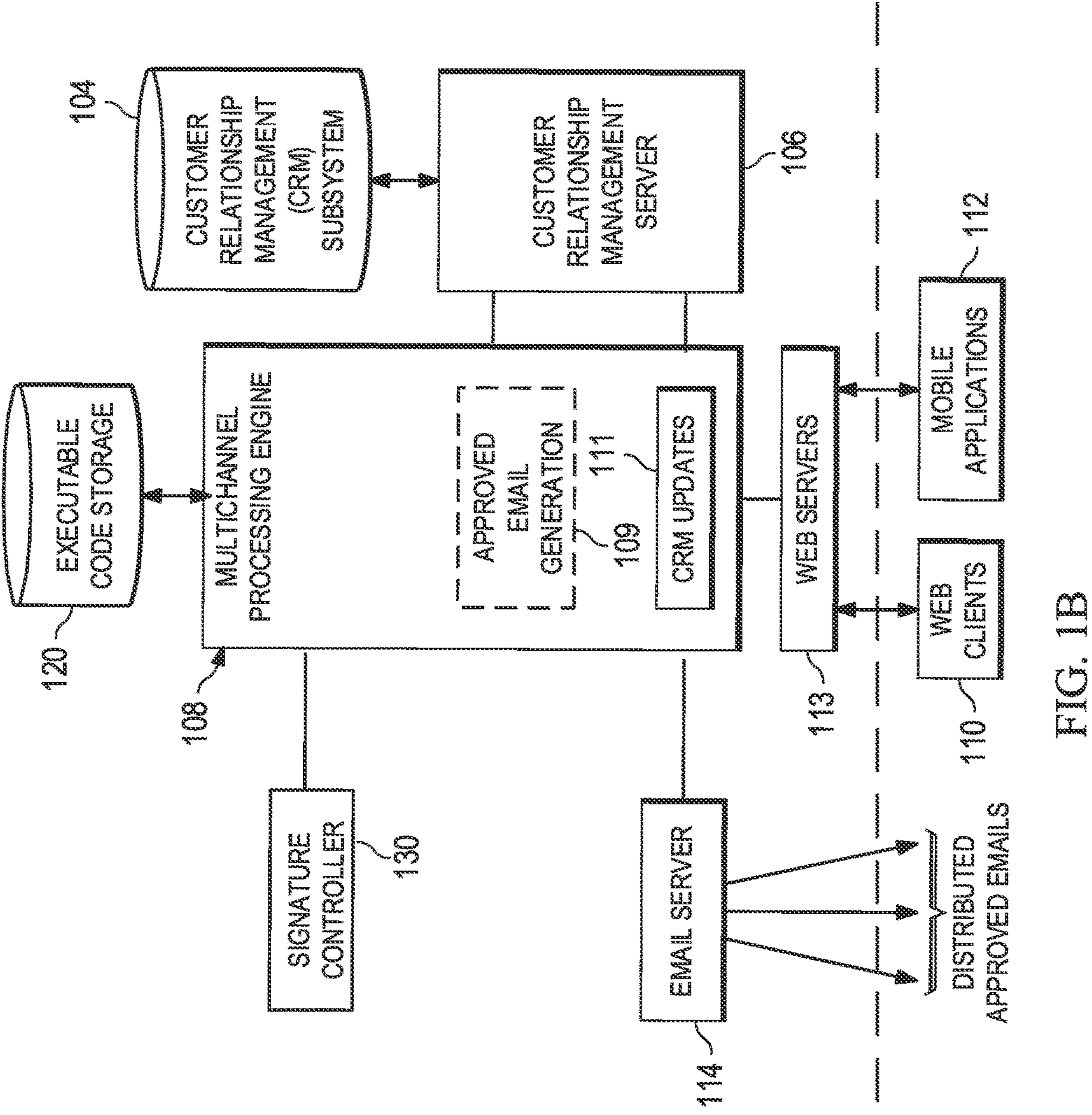
FIG. 1B illustrates an exemplary architecture for providing asynchronous remote signatures according to another embodiment of the present invention.

FIG. 1B is exemplary architecture for providing asynchronous remote signatures according to another embodiment. The presently disclosed embodiment comprises a Customer Relationship Management (CRM) server 106, a multichannel processing engine 108, and a signature controller 130. The customer relationship management server 106 may provide access to a customer relationship management subsystem 104, and the multichannel processing engine 108 may be coupled to the CRM server 106, and an email server 114. In one embodiment, the customer relationship management subsystem 104, and/or the email server 114 may be operated by a third party. The multichannel processing engine 108 may be accessed by users such as company sales representatives through web clients 110 or through mobile apps 112 (such as iOS, Android, Blackberry, or Windows Mobile systems), communicating with the multichannel processing engine 108 through web servers 113. Although the users may be described in the present application as being company sales representatives, this particular described embodiment is not intended to limit the generality of the claims that may eventually issue in patents stemming from the present disclosure.

The executable code comprises computer readable instructions stored on the computer readable medium (the code storage medium 120). The executable code storage 120 is in communication with the various computing machines in the system 100 such as the customer relationship management server 106 and the multichannel processing engine 108.

Figure 2:
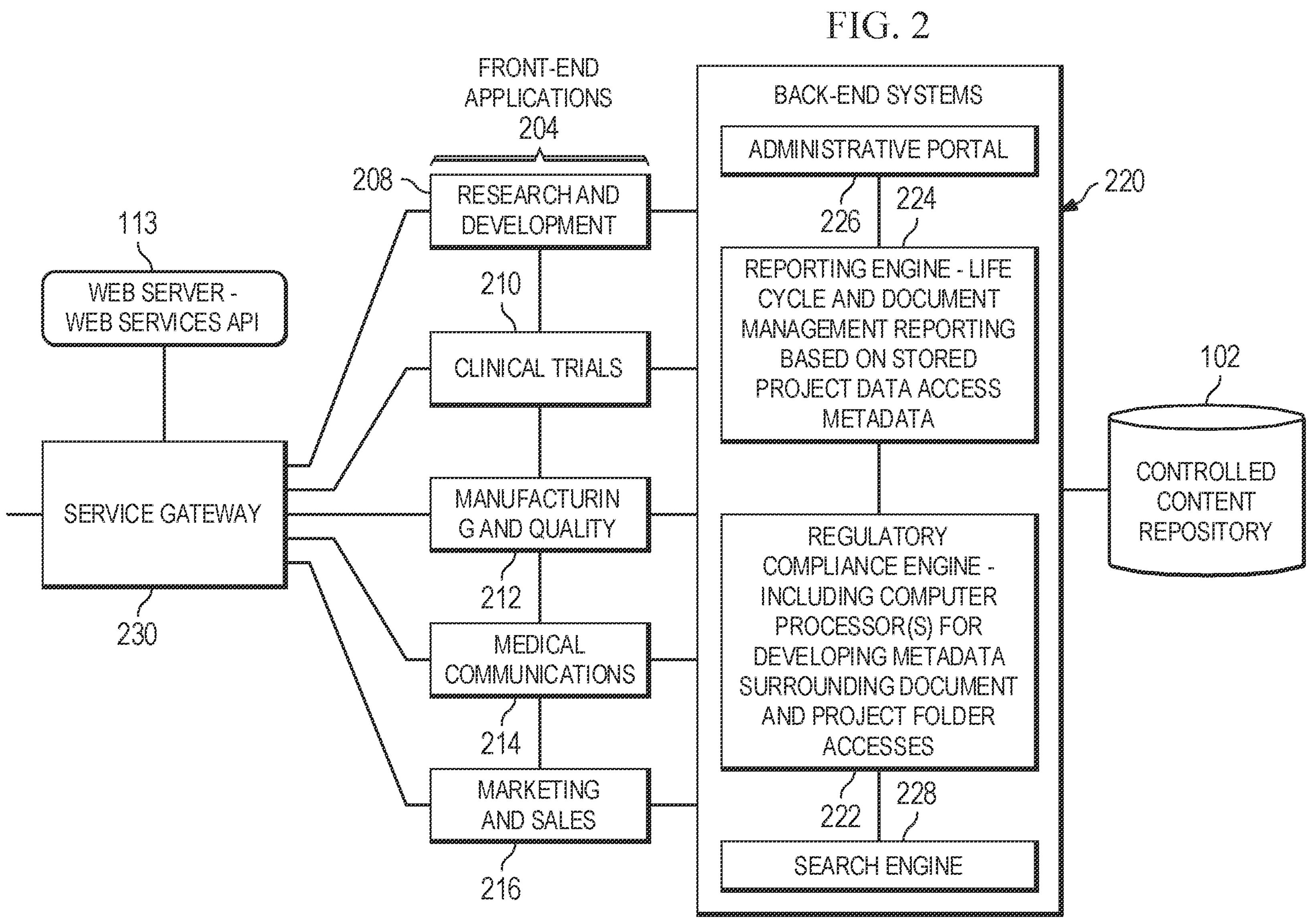
FIG. 2 illustrates an example architecture for the content repository of FIG. 1 in which content is built and organized in a controlled manner that facilitates efficient content generation.

FIG. 2 provides a description of the controlled content repository 102 with additional specific applications and interfaces connected thereto. In an embodiment, this controlled content repository 102 is a cloud-based or distributed network-based system for consolidating an enterprise's data, often times integrating multiple content repositories in an enterprise into a single system having coordinated control, measuring, and auditing of data creation, access and distribution.

In an embodiment of the controlled content repository 102 for the life sciences industry, as illustrated in the figure, this repository 102 can include specific data collections for the following areas and/or business process-specific front-end applications 204: The Research & Development (R&D) front end application 208 provides for an aggregation of materials in support of research and initial clinical trial submissions through building organized and controlled content repositories within the controlled content repository 102. Elements that can be stored, organized, and managed through this frontend include submission bills of materials, Drug Information Association (DIA) reference models support, and submission-ready renderings. This front end 208 is designed to provide an interface to the controlled content repository 102 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROS, sites, investigators and other trial participants. Specific features both ease study and site administration as well as support the DIA trial master file (TMF) reference model. Having this front-end application providing access to the controlled content repository 102 further provides for efficient passing off of controlled content repository content between this phase and other phases of the life sciences development process. The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the controlled content repository 102 whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the controlled content repository 102.

The marketing and sales application 216 application provides an end-to-end solution for the development, approval, distribution, expiration and withdrawal of promotional mate rials. Specific features include Support for global pieces, approved Form FDA 2253 (or similar international forms) form generation, online document, and video annotation, and a built-in digital asset library (DAL). Again, the communications may be through the controlled content repository 102. In disclosed embodiments, there are provided a number of back-end system applications 220 that provide for the management of the data, forms, and other communications in the controlled content repository. For example, the back-end systems applications 220 may include a regulatory compliance engine 222 to facilitate regulatory compliance, including audit trail systems, electronic signatures systems, and system traceability to comply with government regulations, such as 21 CFR Part 11, Annex 11 and GXP-related requirements. The regulatory compliance engine 222 may include processors for developing metadata surrounding document and project folder accesses so from a regulatory compliance standpoint it can be assured that only allowed accesses have been permitted. The regulatory compliance engine 122 may further includes prevalidation functionality to build controlled content in support of installation qualification (IQ) and/or operational qualification (OQ), resulting in significant savings to customers for their system validation costs.

In further disclosed embodiments, the back-end systems 220 may contain a reporting engine 224 that reports on documents, their properties and the complete audit trail of changes. These simple-to-navigate reports show end users and management how content moves through its life cycle overtime, enabling the ability to track plan versus actual and identify process bottlenecks. The reporting engine may include processors for developing and reporting life cycle and document management reporting based on Stored project data and access metadata relative to documents, forms and other communications stored in the controlled content repository 102.

In further disclosed embodiments, the back-end systems 220 can include an administrative portal 226 whereby administrators can control documents, properties, users, security, workflow and reporting with a simple, point-and-click web interface. Customers also have the ability to quickly change and extend the applications or create brand new applications, including without writing additional software code.

In further disclosed embodiments, the back-end systems 220 may include a search engine 228 whereby the controlled content repository 102 can deliver simple, relevant and secure searching. In providing this holistic combination of front-end applications 204 and back-end system applications 220, the various applications can further be coordinated and communicated with by the service gateway 230, which in turn can provide for communications with various web servers and/or web services APIs 113. Such web servers and/or web services APIs 113 can include access to the content and metadata layers of some or all of the various applications 204 and systems 220, enabling seamless integration among complementary systems.

In the context of the described embodiments, the particular features and capabilities integrate with the other elements of the controlled email communication system 100 such that particular features are usable within the various user screens. For example, and without limitation to any other possible combination of features, in the below-described description of generating a tailored approved electronic communication, the above-described search portal can be used to search for approved attachments (i.e. content) within the controlled content repository 102 which may be then attached to one of the tailored template emails being prepared for sending to a recipient. And the synergy of combining these particular systems is that the generation of the controlled content can be done in a controlled fashion such that the approved content can be sent to recipients with greater confidence in the integrity of the data being sent.

In one implementation, the tailored email template may be generated by the approved email generation controller 109, as described in U.S. Pat. No. 9,055,023, entitled System and Method for Controlling Electronic Communications and issued on Jun. 9, 2015, which is hereby incorporated by reference herein for all purposes.

Figure 3A:
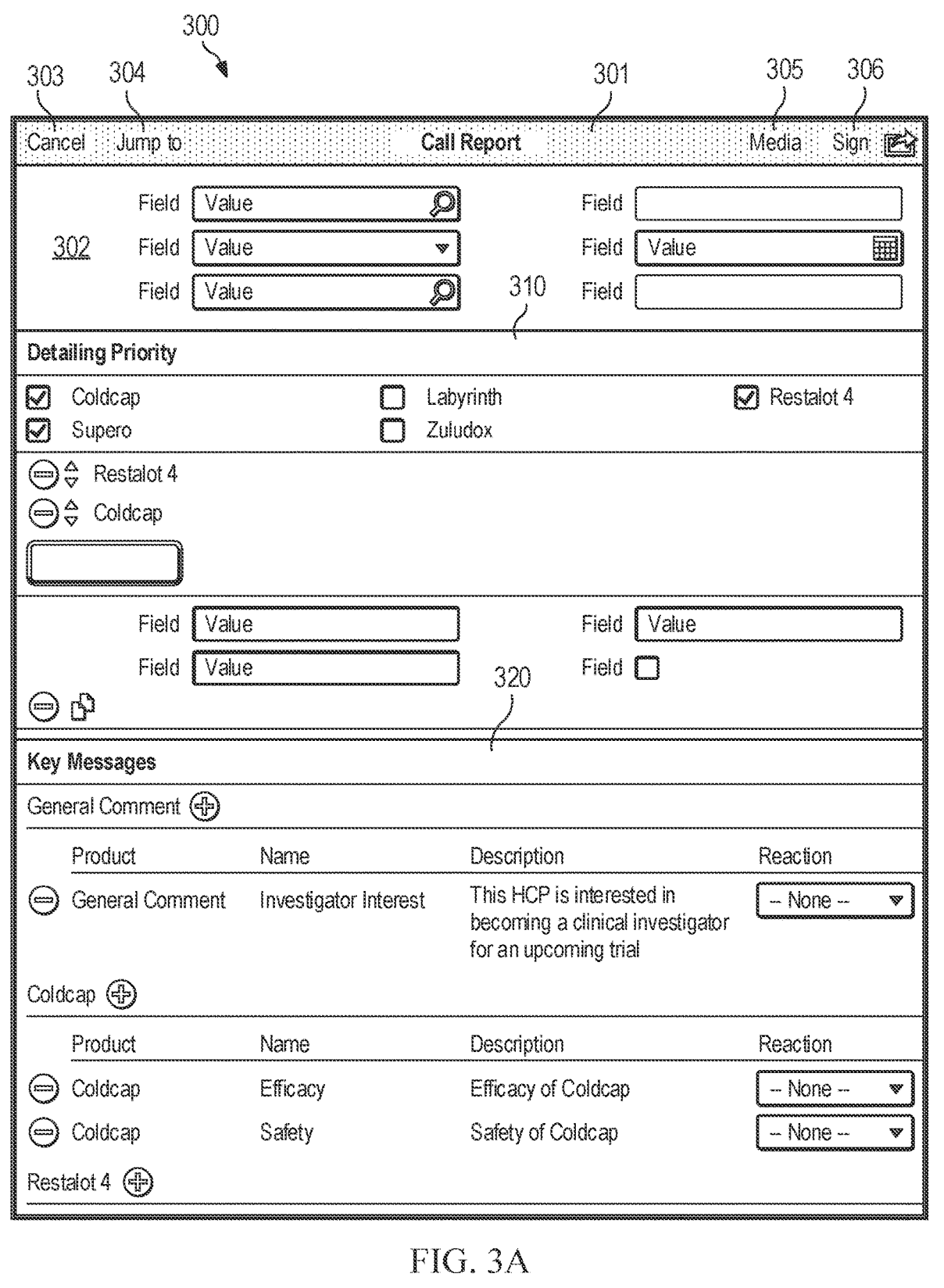

FIG. 3A and FIG. 3B illustrate an example user interface 300 for a call report tracking interactions between a user (e.g., pharmaceutical rep) and an attendee (e.g., a requesting HCP) according to one embodiment of the present invention. The call report user interface 300 may be a standard edit window that opens on top of another user interface. The call report may have a header 301, which may include attendee name and actions such as cancel, jump to another selected attendee, media and sign. When the user selects the "Cancel" button 303, the user interface may be closed. When the user selects the "Jump to" button 304, they may be allowed to select another attendee. "Attendee name" displays the name of the attendee for the call, e.g., Robert Goldberg. The "Media" button 305 may navigate the user to a media selection screen. The "Sign" button 306 may allow the user to enter signature information on the call.

The header 301 may also have other actions such as save, delete, new email, and new medical inquiry. The "Save" button may be used to save all changes to the call report. The "Delete" button may be used to delete the call report. The "Medical Inquiry" may open a new medical inquiry record for the attendee. The "Send Email" button may open a UI for email template selection.

The call report user interface 300 may have fields 302 for the user to enter information about the call, e.g., date, time, duration, sample card number, sample card reason, sample send card, and supervising physician.

The call report user interface 300 may have a detailing priority section 310. The user may enter information about the subject product of the call. The user may also remove or modify detailed products and detailing priority.

The call report user interface 300 may have a key messages section 320. The user may enter information about key messages, including the subject product, name of the key messages, description of the key messages (e.g., the product's efficacy and safety), and the attendee's reaction. The user may also remove or modify key messages.

The call report user interface 300 may also have a media section 330. The system may record information about media shown during the call with the attendee, e.g., presentation name, subject product, message, description, key messages, and the attendee's reaction. The user may remove or modify media information.

The call report user interface 300 may have a call objectives section 340. The user may enter information about call objectives, e.g., the six month checkpoint and the one year checkpoint for a product. The user may also remove or modify call objectives.

The call report user interface 300 may have a samples and promotional items section 350. The user may input information about samples or promotional items, such as products, lots, quantity left, ship to address, and recipients. The user may also remove or modify samples and promotional items.

When a call report is saved, if there are one or more detailed products selected on the call, the detail badge may be displayed next to the attendee name. If there are one or more samples, or other promotional items selected on the call, the sample badge may be displayed next to the attendee name. If a signature is required on a call, but has not yet been received, a signature required badge may appear next to the attendee name. If a signature has been captured on a call, a signed badge may be displayed next to the attendee name.

FIG. 4A illustrates an example user interface 400 for a call report tracking interactions between a user (e.g., pharmaceutical rep) and an attendee (e.g., a requesting HCP) according to another embodiment of the present invention. The call report user interface 400 may have a header 401 which may include the header name "Call Report" and a Cancel button 402, and button designating the type of interaction 403. The user may click on the Cancel button 402 to close the call report user interface 400 without saving. When the user clicks on the type of interaction button 403, a drop down selection list is presented of the various types of interaction (e.g., in-person, remote, email, etc.) the call report is recording between the user and attendee. The call report interface 400 may have a professional information section 405, samples and promotional items section 406, a parent field section, detailing priority section, key messages section, media section, call objectives section, etc. The signature icon 404 prompts the signature set up interface depicted in FIG. 5, as will be described in detail below.

In one implementation, the samples and promotional items section 406 may include samples that the user carries in their possession capable of being distributed to the HCP directly, as well as samples that require placing an order. Specifically, the Business Reply Cards (BRCs) section enables users to create sample order(s) on behalf of requesting HCPs. The call report may have a number of areas for receiving the sample request information, e.g., the name of the product, the method for sending the product, the name of the HCP requesting the product, and the shipping address of the HCP.

Figure 4B:
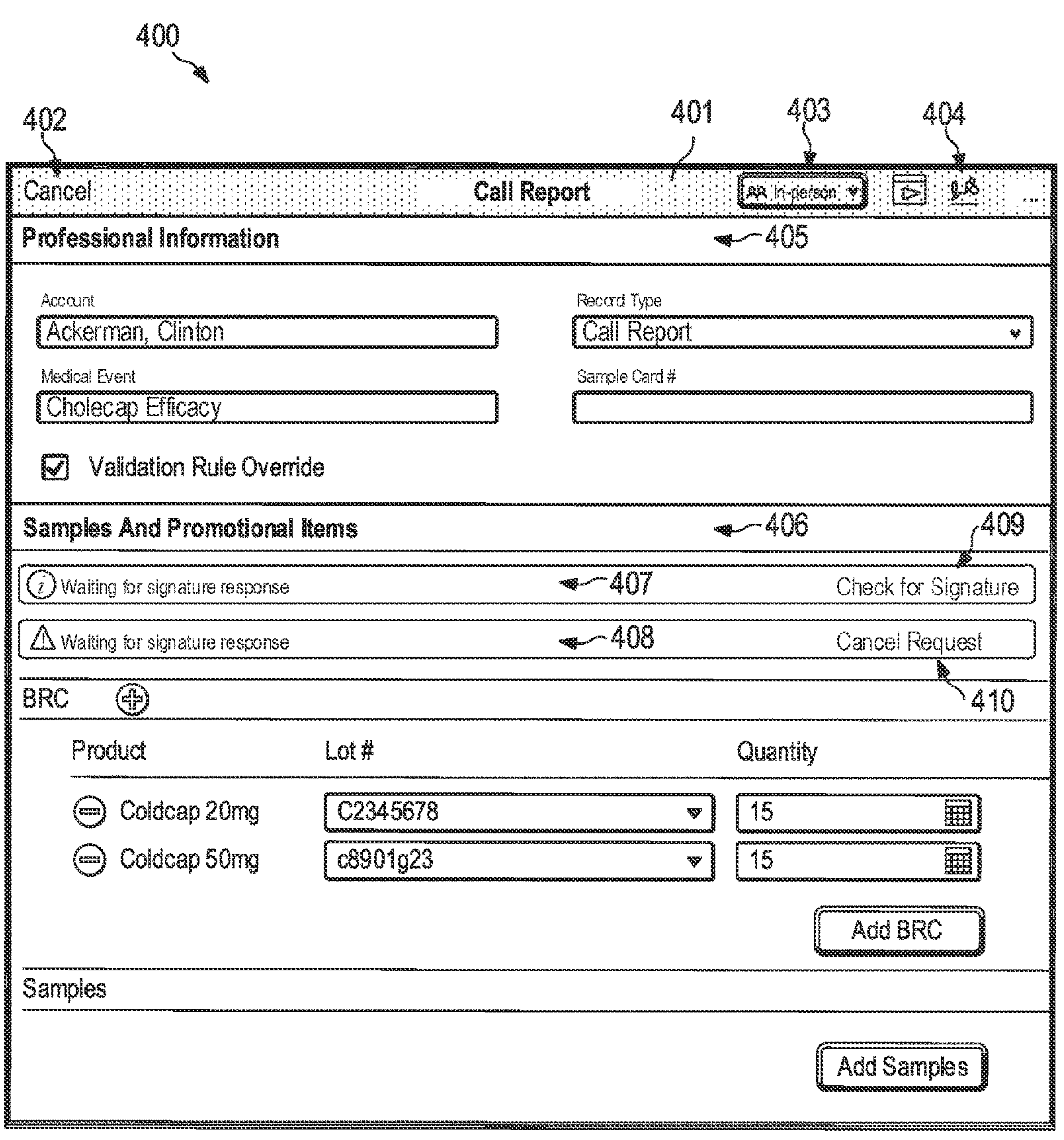

FIG. 4B illustrates an example user interface 420 for a call report tracking interactions between a user (e.g., pharmaceutical rep) and an attendee (e.g., a requesting HCP) when a signature request is pending. The call report user interface 420 may be similar to the user interface 400 with the addition of the signature status notification 407 and the pending signature warning notification 408. The signature status notification 407 may include a "Check for Signature" button which prompts the signature controller 130 to query the status of the signature request. The pending signature warning notification 408 may include a "Cancel Request" button, which prompts the signature controller 130 to cancel the signature request and updates the status of the signature request to request cancelled.

In one implementation, when a user (e.g., pharmaceutical rep) requests samples or promotional items to be sent to an attendee (e.g., a requesting HCP) as depicted in FIG. 3A, 3B, FIG. 4A and FIG. 4B above, a signature is required. The user (e.g., pharmaceutical rep) may use the "Sign" button 306 of FIG. 3A, 3B to share an asynchronous link with the attendee (e.g., a requesting HCP). The asynchronous remote signature process will be described in further detail below in FIG. 8.

Figure 5:
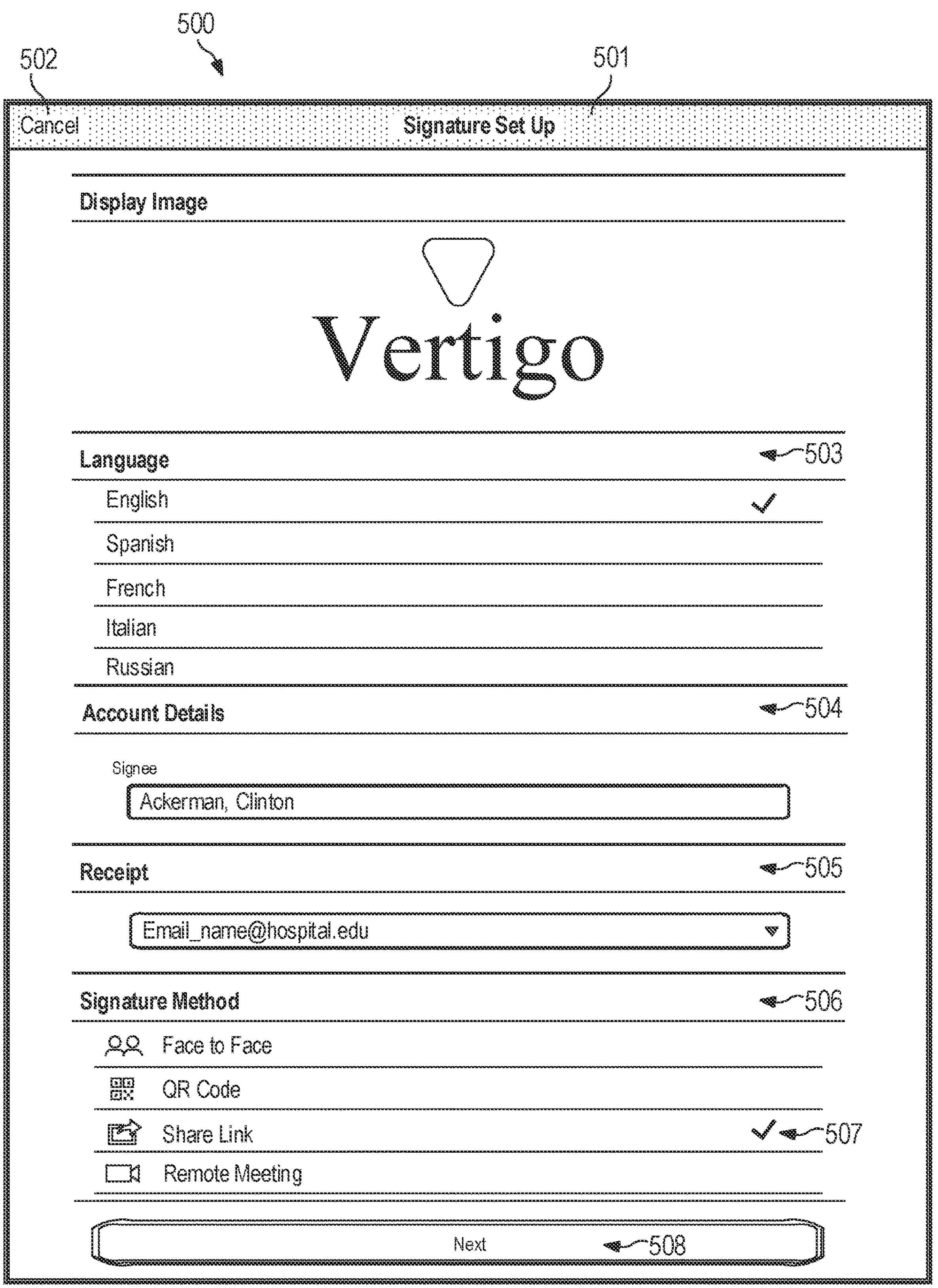
FIG. 5 illustrates an exemplary user interface for signature set up according to some embodiments of the present invention.

FIG. 5 illustrates an example user interface 500 for signature set up according to one embodiment of the present invention. The signature set up interface 500 may have a header 501, cancel button 502, language selection 503, account details section 504, receipt section 505, signature method selection section 506, asynchronous remote signature link method 507, and next button 508. The account details section 504 and receipt section 505 may include a field for the name and electronic mail address to send the asynchronous remote signature request, respectively. In one implementation, the details for the signature set up interface may be retrieved from the CRM 104.

Figure 6A:
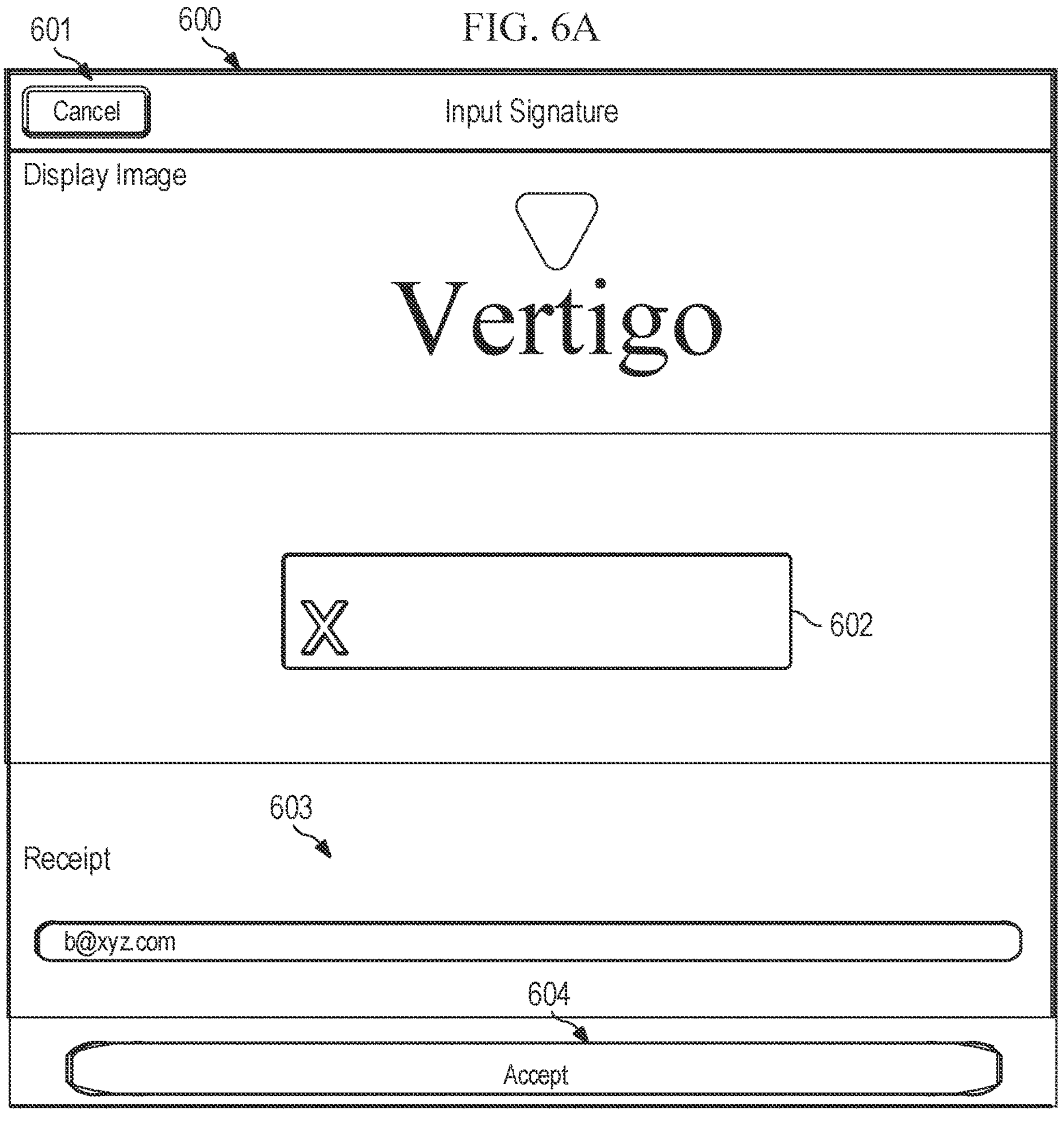
FIG. 6A illustrates an exemplary user interface for inputting asynchronous remote signatures according to some embodiments of the present invention.

FIG. 6A illustrates an example user interface 600 for inputting an asynchronous remote signature. The signature input interface 600 may have a cancel button 601, section for inputting handwritten asynchronous remote signature 602, section to input where to send a receipt 603. In one implementation, when the attendee finishes inputting a handwritten signature in 602, if they are satisfied with the signature they may click an accept signature button 604. A confirmation receipt may be generated and sent to the electronic mail address input in 603.

Figure 6B:
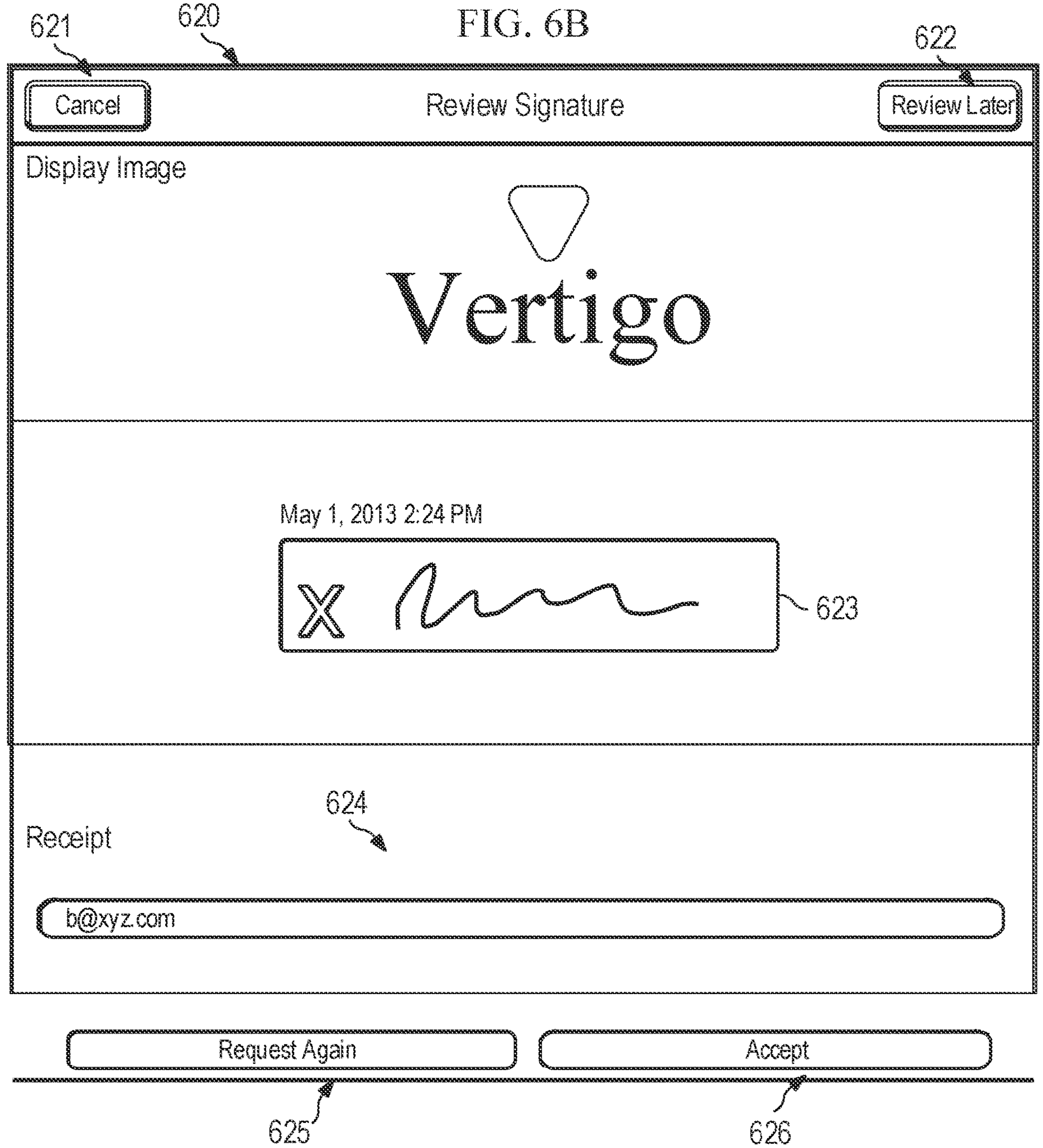
FIG. 6B illustrates an exemplary user interface for reviewing asynchronous remote signatures according to some embodiments of the present invention.

FIG. 6B illustrates an example user interface 620 for reviewing an asynchronous remote signature. The signature review interface 620 may have a cancel button 621, a review later button 622, a signature section 623, a section to input where to send a receipt 624, a request again button 625, and an accept button 626. There may be a timestamp of the handwritten signature provided by the attendee. In one implementation, the user may review and decide that the signature does not comply with the standards required for an acceptable signature (e.g., the signature is a smiley face). The user may click "Request Again" 625, and the signature controller 130 may send another time-sensitive asynchronous remote signature link to the attendee. If the signature is deemed acceptable, the user may click "Accept" 626 and the signature controller 130 may generate and send a confirmation receipt to the electronic mail address input in 624. The signature controller 130 may continue to update the signature request status.

Figure 7:
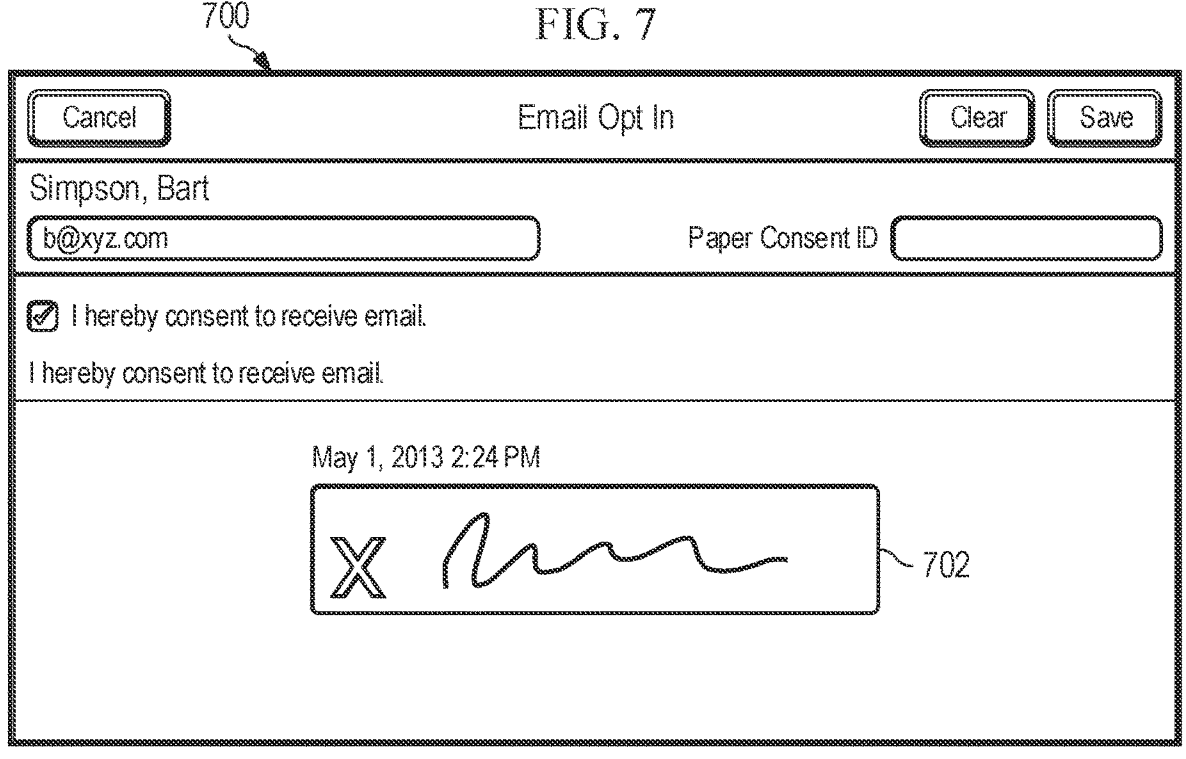
FIG. 7 illustrates a screenshot of one embodiment of the signature capture technology available to users for remote opt-in for electronic communications according to some embodiments of the present invention.

FIG. 7 illustrates a screenshot of one embodiment of the signature capture technology available to users for remote opt-in for electronic communications according to some embodiments of the present invention. In one implementation, the signature controller 130 may obtain asynchronous remote signatures for remote opt-in for electronic communications. In another implementation, the signature controller 130 may obtain asynchronous remote signatures for acknowledgement of content requests.

Figure 8:
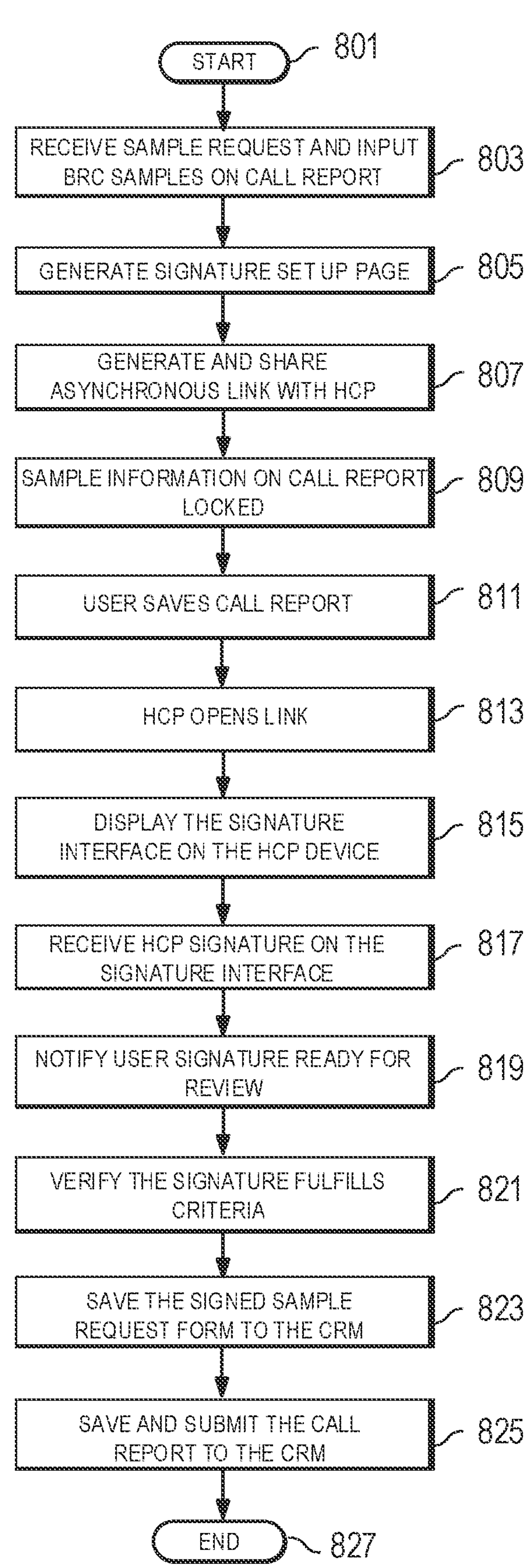
FIG. 8 illustrates an example flowchart of a method for processing a sample request utilizing asynchronous remote signature during an event according to one embodiment of the present invention.

FIG. 8 illustrates an example flowchart of a method for processing a sample request utilizing asynchronous remote signature according to one embodiment of the present invention. The process may start at 801.

At 803, a sample request may be received by the user (e.g., pharmaceutical representative) from the attendee (e.g., a requesting HCP) during their conversation (e.g., a remote meeting, in-person meeting, phone call, etc.). The sample request could be, for example, I want three bottles of Cholecap to be sent to my office at 123 Main Street, ABC city.

In one implementation, the signature controller 130 generates a call report to record the interaction between the user and the attendee. The call report user interface disclosed in FIGS. 3A, 3B, and 4A may be displayed by the signature controller 130 on the user's (e.g. pharmaceutical representative) computing device, which communicates with the system 100 including the CRM server 106, in response to a user request, e.g., a request from the sales representative. The samples and promotional items section of the call report user interface may be provided with the details of the sample request received by the user (e.g, pharmaceutical representative) at the mobile application 112 from the attendee (e.g., a requesting HCP). The signature controller 130 updates the CRM server 106 with the details of the sample request received by the user.

A signature may be required for such a sample request made in 803. At 805, the signature controller 130 accesses information from the CRM subsystem 104 (e.g., details relating to the user, details relating to the requesting HCP, etc.), and generates a signature setup page. The signature setup interface 500 depicted in FIG. 5 with the correct contact information of the requesting HCP is presented to the user by the signature controller 130. In one implementation, the signature setup interface may be accessed via 404 in FIG. 4A. An asynchronous link option may be selected by selecting 507 in the Signature Methods in FIG. 5. The signature controller 130 generates a time-sensitive asynchronous link. In one implementation, the asynchronous remote signature link may have a user configured time period for response. The signature controller 130 may set an expiration date for the asynchronous link that is configured by the user. The expiration date may be the number of days from the time of signature request before the link will be voided. When the current date is greater than the expiration date for the asynchronous link, the signature controller 130 will expire the asynchronous link and set the signature request status to request expired.

At 807, the signature controller 130 may send the asynchronous remote signature link to the location setup in the signature page. In one implementation, the asynchronous remote signature link may be a shortened URL. The signature controller 130 may subsequently set the signature request status to requested. The signature status states may be requested, signature received, signature accepted, canceled, expired, and signature declined. The sample information cannot be changed until the asynchronous signature status is signature accepted, canceled, expired, or signature declined.

At 809, sample information on the call report may be locked while there is a signature request pending. In one implementation, fields related to the sample request may be read-only to prevent tampering or interfering with the pending signature request. For instance, the attendee (e.g., a requesting HCP) address, signature date, fields associated with BRC and Samples in the samples and promotional items section 406, etc.

In one implementation, the signature controller 130 may present the call report user interface 420 in FIG. 4B to the user's (e.g. pharmaceutical representative) computing device after a signature request is initiated. While there is a signature request pending, the user (e.g., pharmaceutical representative) may still access the call report and edit portions unrelated to the sample request (e.g., comments, etc.). The user can also cancel the signature request and edit the call report via 408. In another instance, the user can check for the signature status via 407. The signature controller 130 may query the signature status field. In yet another implementation, the user may edit the call report when the signature request expires.

At 811, the user (e.g., pharmaceutical representative) may save the call report. The signature controller 130 updates the CRM subsystem 104 with the details of the call report. Data captured on the call report user interface 420 (e.g., types of the samples, lot numbers, quality left, recipients, and ship to addresses) may be stored in the customer relationship management subsystem 104, and applied to each of the selected attendees on each respective call so that their attendee specific information may be updated in the customer relationship management subsystem 104. In one implementation, the user may continue to work in CRM irrespective of the signature request status.

At 813, the attendee (e.g, a requesting HCP) may open the asynchronous remote signature link at any time before the configured expiration date. This may be performed irrespective of the user's actions. In one implementation, the attendee may open the link, get interrupted and continue to complete the signature request at a later time.

At 815, when the attendee (e.g., a requesting HCP) clicks the asynchronous remote signature link, the signature controller 130 generates and navigates the attendee to the signature input interface 600 depicted in FIG. 6A.

At 817, the attendee (e.g., a requesting HCP) may input their signature on the interface 600 using the attendee's computing device. In another implementation, the attendee may ignore the asynchronous remote signature link and let the user configured time period for response expire.

At 819, the signature controller 130 sends a notification to the user there is a signature that requires review and acceptance. The signature controller 130 generates and navigates the user to the signature review interface 620 depicted in FIG. 6B.

At 821, the signature review interface 620 may be used to verify if the signature received from the attendee's computing device via the signature input interface 600 is satisfactory. The user may review the signature and click on the "Accept" button 626 in FIG. 6B to accept it. In another implementation, the user may review the signature and decline the signature. In yet another implementation, the user may request the signature again by clicking on the "Request Again" button 625 in FIG. 6B. If the user configured time period for response has not yet lapsed, the user may review the signature at a later time.

At 823, the signature controller 130 may save the signed and accepted sample request form to the CRM subsystem 104.

At 825, a call report for the remote meeting may be generated and saved in the CRM subsystem 104 and a flag may be marked to indicate that the signature was captured through a remote process.

The sample may be shipped to the HCP based on information on the signed sample request form.

The process in FIG. 8 may be used in remote meetings with multiple HCPs, and some HCPs may be face to face, while others are remote.

In one implementation, warnings or notifications may be displayed for reasons that include, but are not limited to, regulatory limitations, customer preferences, demographic information, a customer "opt-out" option where the customer has requested to not have the content delivered; the absence of a customer "opt-in" option where the customer may not receive the communication without prior approval; or that the most current information contained within the customer account profile no longer allows access to the current content delivered by the controlled content repository 102. Information regarding regulatory limitations, customer preferences, demographic information, the "opt-in" or "opt-out" status of individual customer accounts is stored within the customer relationship management subsystem 104.

In another implementation, the relationship between the user and the recipient can also be used to determine consent. For instance, customers in the US deploy the implicit consent model. No consent needs to be captured to send email as long as there is a business relationship between the sender and recipient. In other words, consent is implicit. However, based on the jurisdiction, regulations, and individual customer settings, other consent models may be required. In an alternative implementation, the multichannel processing engine 108 may determine consent to be explicit. The multichannel processing engine 108 identifies a consent type and/or consent level from email records, or settings/preferences accessed from the customer relationship management subsystem 104 and based on the type and/or level determines the consent is in explicit mode.

The flowcharts do not mean to limit the sequence of the steps.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, although the embodiments are described with a customer relationship management subsystem 104, the customer information and content may be from other types of information management systems, e.g., a Closed Loop Marketing (CLM) system. In addition, the multichannel processing engine 108 is shown to communicate with only one customer relationship management subsystem 104 in the drawings, but it may communicate with more customer relationship management subsystems. For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

In all descriptions of "servers" or other computing devices herein, whether or not the illustrations of those servers or other computing devices similarly show a server-like illustration in the figures, it should be understood that any such described servers or computing devices will similarly per form their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

The approved content may be in any format, e.g., text, audio, video, picture, multimedia, or PDF.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure.

Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for processing a sample request utilizing asynchronous remote signature, the method comprising:

establishing a controlled content repository, the controlled content repository being securely and controllably accessed;

establishing an access protocol for the controlled content repository;

storing approved content within the controlled content repository, whereby the approved content is stored in the controlled content repository according to the access protocol and whereby the access protocol comprises at least one set of alignment rules for determining if a first item of approved content within the controlled content repository can be made available to a first user to be included in a call report recording approved content shared with a second user;

establishing a secure information management system, the information management system storing and providing coordinated data;

receiving, by a first user computing device, information about a set of one or more samples from the call report recording the interaction between the first user and second user according to a communication protocol, wherein the call report is stored in the secure information management system and the set of one or more samples inputted is a pharmaceutical product;

generating a time-restricted asynchronous share link comprising a URL and electronically transmitting the time-restricted asynchronous share link via email to a second user computing device, wherein the period of time the second user may access the shared link is previously configured by the first user, and wherein upon accessing the URL the signature controller generates and navigates the second user to a signature input interface on the second user computing device;

creating and tracking a signature request status object stored in the information management system, wherein the signature request status object contains the current status of the asynchronous signature process, the status comprising one of: requested, signature received, signature accepted, cancelled, expired, or signature declined; and locking business reply card entries on the call report by setting fields related to the sample request to read-only in the information management system until the asynchronous share link is accessed and a signature is received.

2. The method of claim 1, further comprising:

invalidating the time-restricted asynchronous share link after receiving the signature; and updating the signature request status object to reflect receiving the signature.

3. The method of claim 2, further comprising: receiving a first input for rejecting the inputted signature, by the first user computing device; and sending a new time-restricted asynchronous share link to the second user computing device, wherein the period of time the new time-restricted asynchronous shared link can be accessed is previously configured by the first user.

4. The method of claim 1, further comprising:

receiving a second input for accepting the inputted signature when the inputted signature satisfies predefined criteria and contains certain user defined properties, by the first user computing device;

invalidating the time-restricted asynchronous share link after the second user computing device inputs the signature; and updating the signature request status object to reflect receiving the signature.

5. The method of claim 1, further comprising: when the previously configured period of time that the shared link can be accessed lapses, the time-restricted asynchronous share link is invalidated.

6. The method of claim 1, further comprising: receiving a third input at the second user computing device for rejecting the signature request.

7. The method of claim 1, further comprising: receiving a fourth input at the first user computing device for canceling the signature request and invalidating the time-restricted asynchronous share link.

8. The method of claim 1, wherein the information management system is a customer relationship management (CRM) system.

9. The method of claim 1, wherein the time-restricted asynchronous share link is a shortened URL.

10. A computer-implemented method for processing a sample request utilizing asynchronous remote signature, the method comprising:

establishing a secure information management system, the information management system storing and providing coordinated data;

receiving, by a first user computing device, information about a set of one or more samples from a call report recording the interaction between a first user and second user according to a communication protocol, wherein the call report is stored in the secure information management system and the set of one or more samples inputted is a pharmaceutical product;

generating a time-restricted asynchronous share link comprising a URL and electronically transmitting the time-restricted asynchronous share link via email to a second user computing device, wherein the period of time the second user may access the shared link is previously configured by the first user, and wherein upon accessing the URL the signature controller generates and navigates the second user to a signature input interface on the second user computing device;

creating and tracking a signature request status object stored in the information management system, wherein the signature request status object contains the current status of the asynchronous signature process, the status comprising one of: requested, signature received, signature accepted, cancelled, expired, or signature declined; and locking business reply card entries on the call report by setting fields related to the sample request to read-only in the information management system until the asynchronous share link is accessed and a signature is received.

11. The method of claim 10, further comprising: wherein the coordinated data includes a healthcare providers license; and prior to sending the time-restricted asynchronous share link validating the second user's license information.

12. The method of claim 10, further comprising:

invalidating the time-restricted asynchronous share link after receiving the signature; and updating the signature request status object to reflect receiving the signature.

13. The method of claim 12, further comprising: receiving a first input for rejecting the inputted signature, by the first user computing device; and sending a new time-restricted asynchronous share link to the second user computing device, wherein the period of time the new time-restricted asynchronous shared link can be accessed is previously configured by the first user.

14. The method of claim 10, further comprising:

receiving a second input for accepting the inputted signature when the inputted signature satisfies predefined criteria and contains certain user defined properties, by the first user computing device;

invalidating the time-restricted asynchronous share link after the second user computing device inputs the signature; and updating the signature request status object to reflect receiving the signature.

15. The method of claim 10, further comprising: when the previously configured period of time that the shared link can be accessed lapses, the time-restricted asynchronous share link is invalidated.

16. The method of claim 10, further comprising: receiving a third input at the second user computing device for rejecting the signature request.

17. The method of claim 10, further comprising: receiving a fourth input at the first user computing device for canceling the signature request and invalidating the time-restricted asynchronous share link.

18. The method of claim 10, wherein the information management system is a customer relationship management (CRM) system.

19. The method of claim 10, wherein the time-restricted asynchronous share link is a shortened URL.

* * * * *